US011456008B2

(12) United States Patent
Natarajarathinam et al.

(10) Patent No.: US 11,456,008 B2
(45) Date of Patent: *Sep. 27, 2022

(54) RECESSED HARDMASK USED TO FORM HEAT-ASSISTED MAGNETIC RECORDING NEAR-FIELD TRANSDUCER WITH HEAT SINK

(71) Applicant: Seagate Technology LLC, Cupertino, CA (US)

(72) Inventors: Anusha Natarajarathinam, Bloomington, MN (US); Yongjun Zhao, Eden Prairie, MN (US); Hui Brickner, Savage, MN (US); Dongsung Hong, West Lafayette, IN (US)

(73) Assignee: Seagate Technology LLC, Fremont, CA (US)

( * ) Notice: Subject to any disclaimer, the term of this patent is extended or adjusted under 35 U.S.C. 154(b) by 691 days.

This patent is subject to a terminal disclaimer.

(21) Appl. No.: 16/291,465

(22) Filed: Mar. 4, 2019

(65) Prior Publication Data

US 2019/0198046 A1 Jun. 27, 2019

Related U.S. Application Data

(63) Continuation of application No. 14/987,058, filed on Jan. 4, 2016, now Pat. No. 10,224,064.

(51) Int. Cl.
G11B 5/127 (2006.01)
G11B 5/105 (2006.01)
(Continued)

(52) U.S. Cl.
CPC ............ *G11B 5/1272* (2013.01); *G11B 5/105* (2013.01); *G11B 5/3136* (2013.01);
(Continued)

(58) Field of Classification Search
CPC ............ G11B 2005/0021; G11B 5/105; G11B 5/1272; G11B 5/3136; G11B 5/3163; G11B 5/40

See application file for complete search history.

(56) References Cited

U.S. PATENT DOCUMENTS 8,164,855 B1 4/2012 Gibbons et al.
8,165,855 B2 4/2012 Yilbas et al.
(Continued)

*Primary Examiner* — Minh N Trinh
(74) *Attorney, Agent, or Firm* — Mueting Raasch Group

(57) ABSTRACT

A method involves depositing a near-field transducer on a substrate of a slider. The near-field transducer comprises a plate-like enlarged portion and a peg portion. A first hard stop extending from the near field transducer and an air bearing surface is formed. A heat sink is formed on the enlarged portion and the first hard stop. A dielectric material is deposited over the near-field transducer and the heat sink. A second hard stop is deposited on the dielectric material away from the air bearing surface. The second hard stop comprises a recess corresponding in size and location to the heat sink. The method involves milling at an oblique angle to the substrate between the first hard stop and second hard stop to cut through the heat sink at the angle. The recess of the second hard stop increases a milling rate over the heat sink compared to a second milling rate of the dielectric away from the heat sink.

20 Claims, 12 Drawing Sheets

(51) Int. Cl.
*G11B 5/31* (2006.01)
*G11B 5/40* (2006.01)
*G11B 5/00* (2006.01)

(52) U.S. Cl.
CPC .............. *G11B 5/3163* (2013.01); *G11B 5/40* (2013.01); *G11B 2005/0021* (2013.01)

(56) References Cited

U.S. PATENT DOCUMENTS

| | | |
|---|---|---|
| 8,375,565 B2 | 2/2013 | Hu et al. |
| 8,486,286 B1 | 7/2013 | Gao et al. |
| 8,491,801 B1 | 7/2013 | Tanner et al. |
| 8,634,280 B1 | 1/2014 | Wang et al. |
| 8,721,902 B1 | 5/2014 | Wang et al. |
| 8,834,728 B1 | 9/2014 | Hu et al. |
| 8,891,205 B2 | 11/2014 | Zhou et al. |
| 8,908,482 B1 | 12/2014 | Balamane et al. |
| 8,970,988 B1 | 3/2015 | Li et al. |
| 8,980,109 B1 | 3/2015 | Zhou et al. |
| 9,007,725 B1 | 4/2015 | Diao et al. |
| 9,042,051 B2 | 5/2015 | Zeng et al. |
| 9,620,152 B2 | 4/2017 | Kautzky et al. |
| 9,728,209 B2 | 8/2017 | Chen et al. |
| 9,928,859 B2 | 3/2018 | Kautzky et al. |
| 10,224,064 B2 * | 3/2019 | Natarajarathinam ........................ G11B 5/1272 |
| 2019/0198046 A1 * | 6/2019 | Natarajarathinam ...................... G11B 5/3163 |

* cited by examiner

RECESSED HARDMASK USED TO FORM HEAT-ASSISTED MAGNETIC RECORDING NEAR-FIELD TRANSDUCER WITH HEAT SINK

RELATED PATENT DOCUMENTS

This application is a continuation of U.S. Patent Application Serial No. 14/987,058, filed Jan. 4, 2016, issued as U.S. Pat. No. 10,224,064 on Mar. 5, 2019, which is incorporated herein by reference in its entirety.

SUMMARY

A method involves depositing a near-field transducer on a substrate of a slider. The near-field transducer comprises a plate-like enlarged portion and a peg portion. A first hard stop extending from the near field transducer and an air bearing surface is formed. A heat sink is formed on the enlarged portion and the first hard stop. A dielectric material is deposited over the near-field transducer and the heat sink. A second hard stop is deposited on the dielectric material away from the air bearing surface. The second hard stop comprises a recess corresponding in size and location to the heat sink. The method involves milling at an oblique angle to the substrate between the first hard stop and second hard stop to cut through the heat sink at the angle. The recess of the second hard stop increases a milling rate over the heat sink compared to a second milling rate of the dielectric away from the heat sink.

A method involves depositing a near-field transducer on a substrate of a slider. The near-field transducer comprising a plate-like enlarged portion and a peg portion. A first hard stop extending from the near field transducer and an air bearing surface is formed. A heat sink is formed on the enlarged portion and the first hard stop. The heat sink comprises a first material. A dielectric is formed over the near-field transducer and the heat sink. The dielectric comprises a second material. A second hard stop is deposited on the dielectric material away from the air bearing surface. The second hard stop comprises a recess corresponding in size and location to the heat sink. The method involves milling at an oblique angle to the substrate between the first hard stop and second hard stop to cut through the heat sink at the angle. The recess of the second hard stop increases a milling rate of the first material compared to a second milling rate of the second material.

BRIEF DESCRIPTION OF THE DRAWINGS

The discussion below makes reference to the following figures, wherein the same reference number may be used to identify the similar/same component in multiple figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
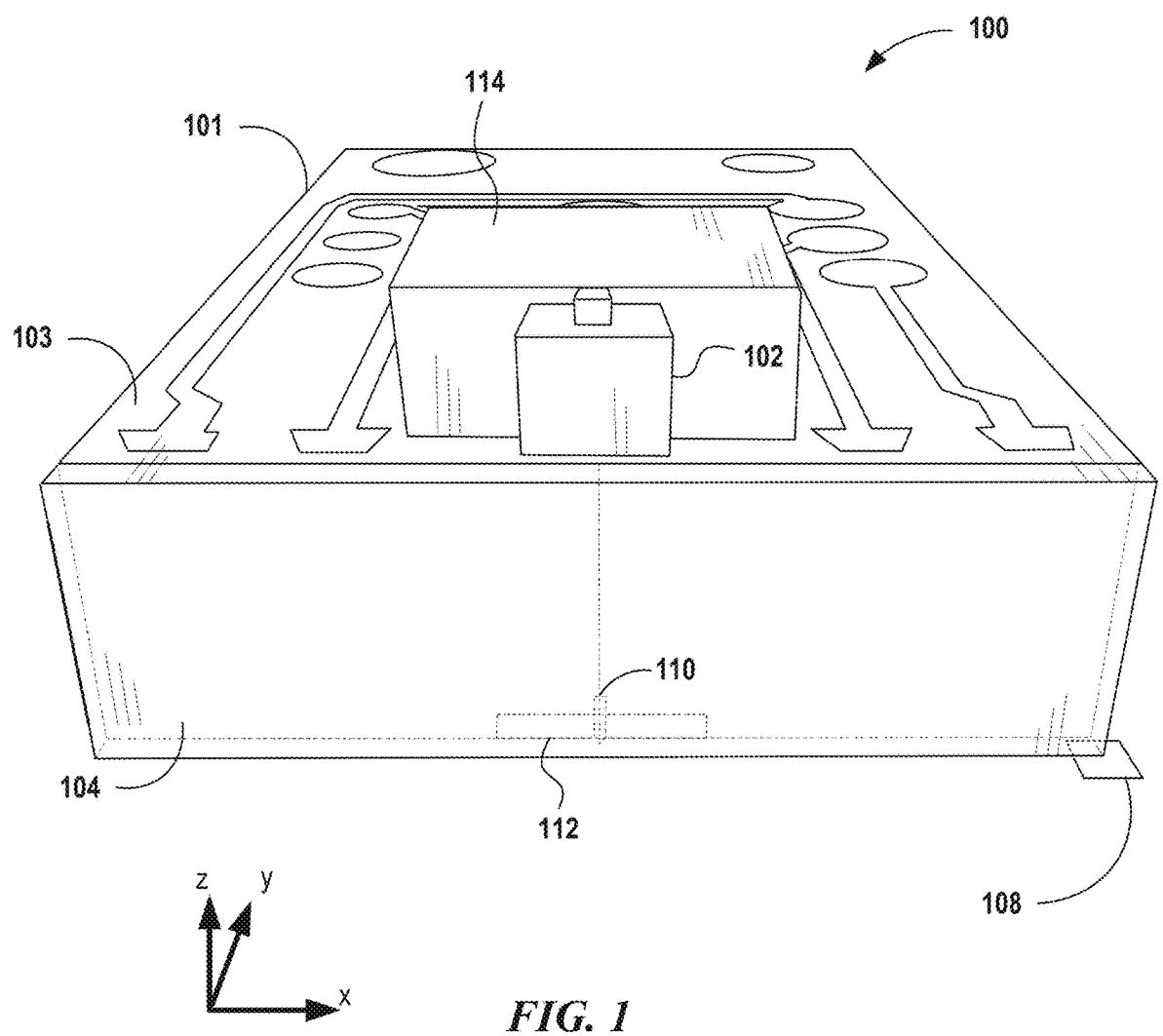
FIG. 1 is a block diagram of a hard drive slider and media arrangement according to an example embodiment.

The present disclosure generally relates to waveguides that deliver energy to a near-field transducer (NFT) that is used in applications such as heat-assisted magnetic recording (HAMR). This technology, also referred to as energy-assisted media recording (EAMR), thermally-assisted media recording (TAMR), and thermally-assisted recording (TAR), etc., uses an energy source such as a laser to couple energy to a NFT, which achieves surface plasmon resonance in response. The surface plasmons are directed to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

The present disclosure relates to manufacturing NFTs having particular configurations. While this is described in the context of HAMR recording, such NFTs may have uses besides HAMR recording and the description of HAMR devices is not meant to be limiting. In reference to FIG. 1, a perspective view shows a HAMR read/write head 100 according to an example embodiment. The read/write head 100 includes a laser diode 102 located on an input surface 103 of a slider body 101. In this example, the input surface 103 is a top surface, which is located opposite to a media-facing surface 108 that is positioned over a surface of a recording media (not shown) during device operation. The media-facing surface 108 is held proximate to the moving media surface while reading and writing data. The media-facing surface 108 may be configured as an air-bearing surface that maintains separation from the media surface via a thin layer of gas, such as air or helium.

The laser diode 102 delivers light to an NFT 112 via a waveguide 110, which is located near the media-facing surface 108. The NFT 112 emits energy used to heat the recording media as it passes by the read/write head. Optical coupling components, such as the waveguide 110 and NFT 112, are formed integrally within the slider body 101 (near a trailing edge surface 104, in this example) and function as an optical path that delivers energy from the laser diode 102 to the recording media.

The laser diode 102 in this example is shown as coupled to the slider body 101 via a submount 114. The submount 114 can be used to orient and affix an edge-emitting laser so that its output is directly downwards (negative z-direction in the figure). The input surface 103 of the slider body 101 may include a facet, mirror, grating or other coupling features near the waveguide 110 to receive light from the laser diode 102.

Figure 2:
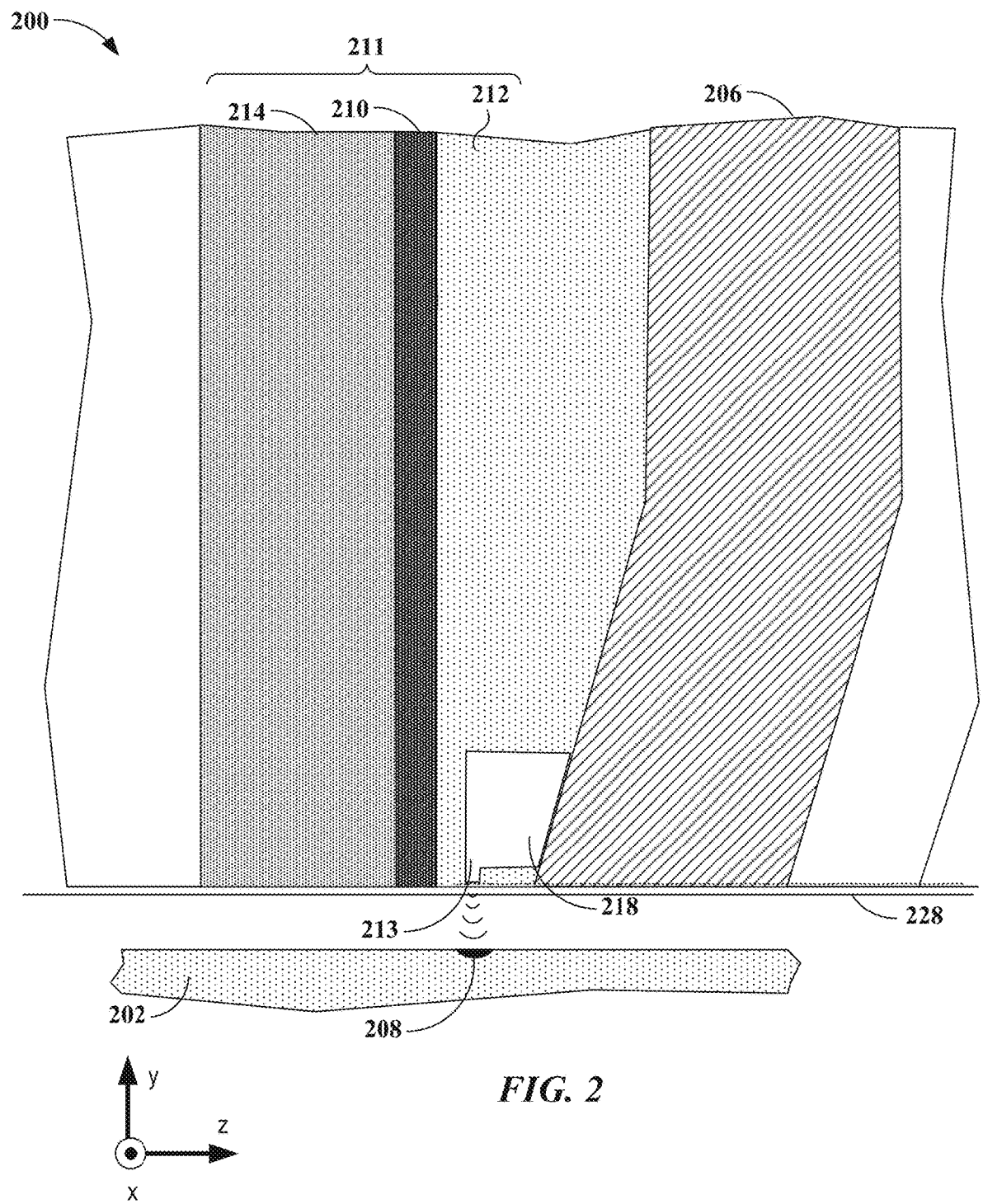
FIG. 2 is a cross-sectional view near the media-facing surface of the hard drive slider of FIG. 1.

In FIG. 2, a cross-sectional view illustrates portions of an apparatus 200 (such as slider body shown in FIG. 1). The apparatus 200 includes a near field transducer region 213, and a heat sink region 218. The heat sink 218 may be formed, for example, of Cr, Ru, Au, or Rh. In this view, the near field transducer region 213 is shown proximate to a surface of magnetic media 202, e.g., a magnetic disk. A waveguide 211 delivers electromagnetic energy to the near field transducer region 213, which directs the energy to create a small hotspot 208 on the media 202. A magnetic write pole 206 causes changes in magnetic flux near a media facing surface 228 in response to an applied current. Flux from the write pole 206 changes a magnetic orientation of the hotspot 208 as it moves past the write pole 206 in the downtrack direction (z-direction).

The waveguide 211 includes one or more layers of material that form core 210 surrounding by cladding layers 212, 214. The core 210 and cladding layers 212, 214 may be made from dielectric materials such as $Al_2O_3$, SiOxNy, $SiO_2$, $Ta_2O_5$, $TiO_2$ or $Nb_2O_5$, etc. Generally, the dielectric materials are selected so that the refractive index of the core 210 is higher than refractive indices of the cladding layers 212, 214. This arrangement of materials facilitates efficient propagation of light through the waveguide 211.

The energy applied to the near field transducer region 213 of apparatus 200 to create the hotspot 208 can cause a significant temperature rise in the near field transducer region 213. The near field transducer region 213 may be formed to include a peg, pin, bar, or other protrusion having relatively small dimensions in order to keep the generated plasmonic field small. The near field transducer region 213 is formed from a relatively soft plasmonic metal (e.g., Au, Ag, Cu, Al, and alloys thereof) that is susceptible to deformation and/or recession at high temperature. As a result, the heat sink region 218 may be formed proximate to or integral with the near field transducer region 213 (i.e. thermally coupled thereto) to dissipate heat and reduce protrusion of the near field transducer region 213. The heat sink region 218 may be thermally coupled to other components (e.g., the write pole 206) in order to draw heat away from the near field transducer region 213. Heat reduction in the near field transducer region 213 can reduce the likelihood of peg recession and other failure modes that negatively impact the operational life of HAMR devices.

Figure 3A:
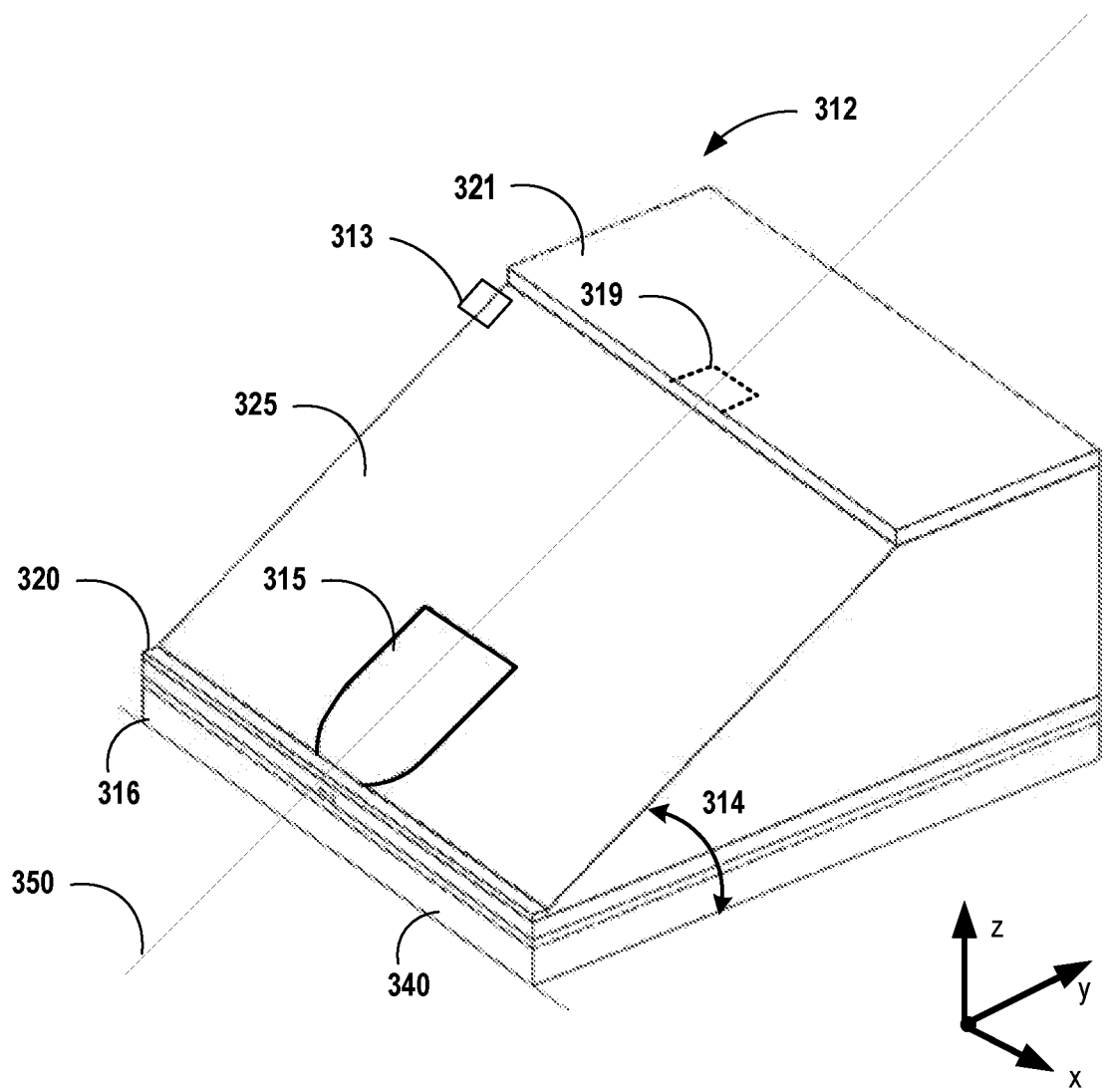
FIG. 3A is an isometric view of an NFT system according to an example embodiment.

In FIG. 3A a perspective view shows formation of an NFT system 312 in accordance with an example embodiment. The NFT system 312 includes a heat sink 315. Surrounding dielectric portion 325 may be made up of a different material than the heat sink 315. For example, these layers could include $SiO_2$ and/or $Al_2O_3$. To create the sloped surface 313 shown in FIG. 3A, the NFT system 312 goes through a milling process. For example, the milling process may include a static mill process, an induction mill process, an ion mill and/or a reactive mill in a static angle. Due to a difference in material of the heat sink 315 and the surrounding dielectric 325, these regions may mill at different rates. This may cause the sloped surface 313 to be uneven.

Generally, the NFT system 312 is formed by depositing the near-field transducer (see NFT 318 in FIG. 3C) on a substrate 340 of a slider. The near-field transducer 318 includes a plate-like enlarged portion 360 and a cylinder like heat sink 315 proximate the enlarged portion 360. A dielectric material 325 is deposited over the near-field transducer 318. A first hard stop 320 is formed extending from an edge of the heat sink 315 to an air bearing surface 316. A second hard stop 321 is deposited on the dielectric material away from the air bearing surface 316. The materials are milled at an oblique angle 314 to the substrate 340 between the first hard stop 320 and second hard stop 321 to cut through the heat sink 315 at the angle. The slope angle 314 corresponds to an angle of a write pole that will be formed proximate the NFT 318.

Generally, the NFT system 312 is formed by depositing the near-field transducer (see NFT 318 in FIG. 3C) on a substrate 340 of a slider. The near-field transducer 318 includes a plate-like enlarged portion 360 and a cylinder like heat sink 315 proximate the enlarged portion 360. A dielectric material 325 is deposited over the near-field transducer 318. A first hard stop 320 is formed extending from an edge of the heat sink 315 to an air bearing surface 316. A second hard stop 321 is deposited on the dielectric material away from the air bearing surface 316. The materials are milled at an oblique angle 314 to the substrate 340 between the first hard stop 320 and second hard stop 321 to cut through the heat sink 315 at the angle. The slope angle 314 corresponds to an angle of a write pole that will be formed proximate the NFT 318.

Figure 3B:
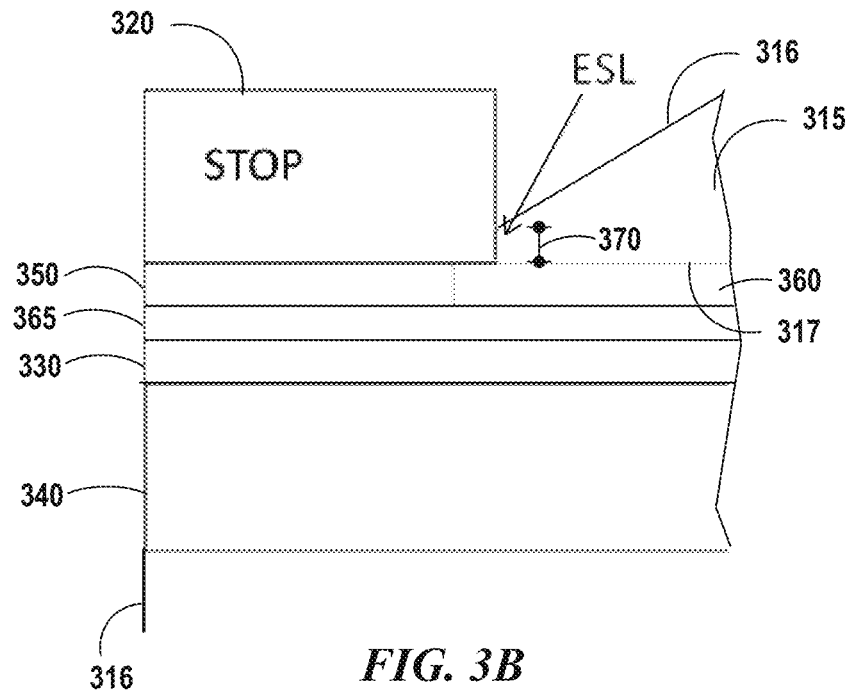
FIG. 3B is a cross-sectional view of an NFT system according to an example embodiment.
Figure 3C:
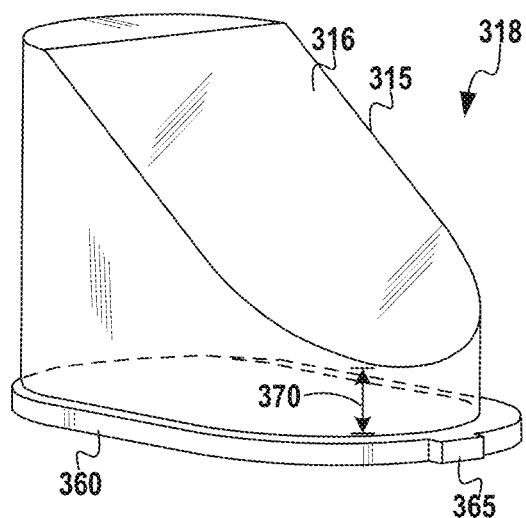
FIG. 3C is an isometric view of an NFT according to an example embodiment.

FIG. 3B shows a cross-section of the NFT system 312 along the cut line 350 of FIG. 3A. FIG. 3B illustrates a more detailed diagram of the layers of the NFT system 312. The NFT system 312 includes an enlarged region 360. A peg region 365 extends from the enlarged region 360 toward the media-facing surface. While the various embodiments described herein are applicable to a variety of NFT designs, including stadium-style (stadium-shaped enlarged portion) and lollipop-style (circular-shaped enlarged portion) near-field transducer designs, FIGS. 3A and 3B illustrate an NFT system 312 having an stadium-style design, as shown in the perspective view of FIG. 3C.

A heat sink 315 has a sloped planar upper surface 316 and a planar lower surface 317. The enlarged region 360 is in contact with the heat sink 315 at the planar lower surface 317. The heat sink 315 and the enlarged region 360 each have a first end, both of which terminate proximate the media-facing surface 108 of the slider on which the NFT is formed. The heat sink 315 terminates in an etch stop region. The width of the heat sink portion between the sloped planar upper surface 316 and the planar lower surface 317 at the etch stop 320 after the milling process is the etch stop length (ESL) 370. This width may change depending on the materials of the heat sink and the surrounding cladding layers 330, 350.

As described above, according to various embodiments, the heat sink material and the surrounding dielectric may be made up of different materials. The different materials may have different mill rates. As such, this may cause either over-cutting into the dielectric or insufficient cutting of the NFT heat sink. As indicated by dashed lines, in order to more evenly mill these materials, the second hard stop includes a recess 319 corresponding in size and location to the heat sink 315. The recess 319 increasing a milling rate over the heat sink 315 compared to a second milling rate of the dielectric 325 away from the heat sink 315.

Figure 4A:
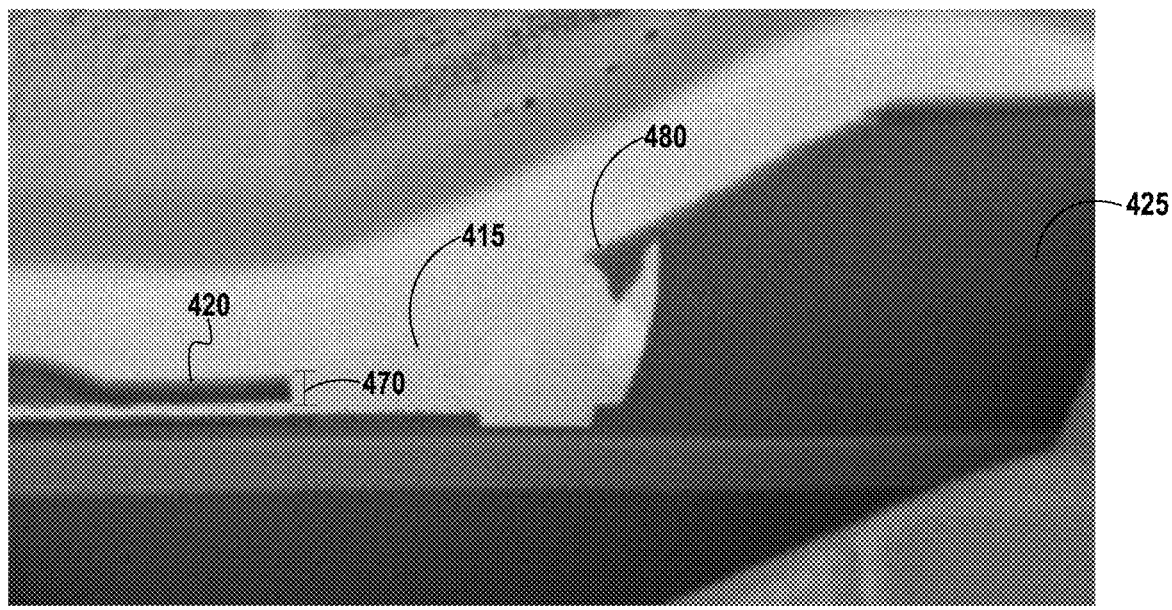
FIGS. 4A, 4B, and 5 are electron microscope images illustrating an etch stop length after milling for a heat sink portion and a dielectric portion according to example embodiments.

The image in FIG. 4A illustrates an etch stop dimension 470 of the heat sink portion 415. The etch stop length 470 may be between 20 nm and 80 nm. In some cases the etch stop length is between about 15 nm to about 50 nm, e.g., about 25 nm. In various embodiments, the etch stop length may be about 44 nm or about 70.7 nm, for example. The slope 480 of the sloped planar upper surface and the slope of the dielectric portion is between about 20 and 30 degrees. In some cases, the slope is about 25 degrees.

Figure 4B:
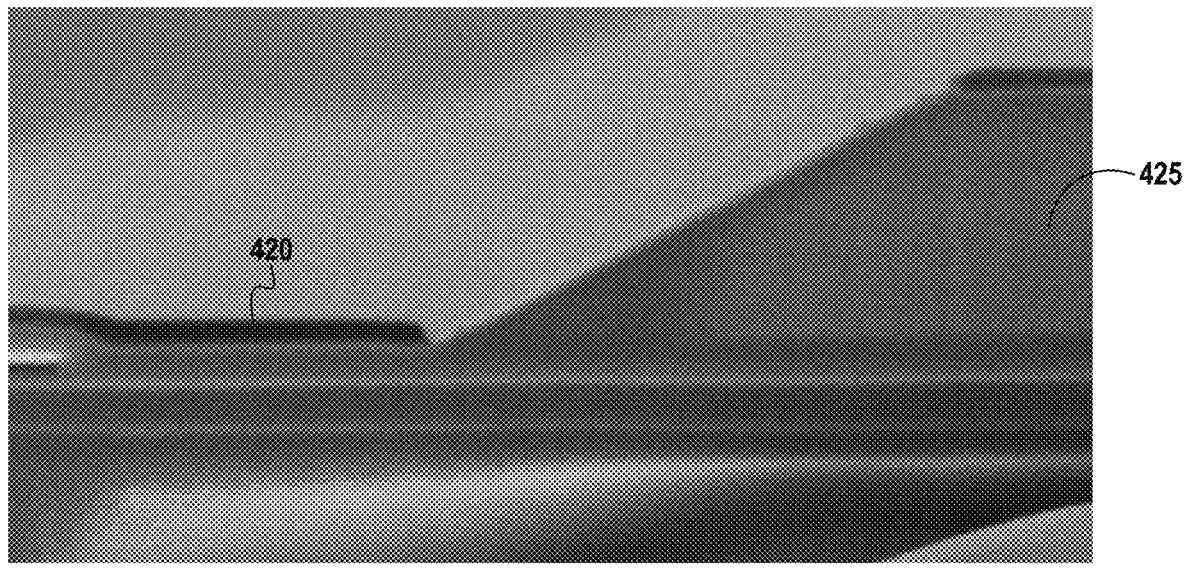

Without the recess feature, the image in FIG. 4B shows the etch stop length 470 for the dielectric 425. Note that the dielectric has been cut more by the etching than the NFT, resulting in there being no etch stop in the dielectric portion near the hard mask 420. In some cases the etch stop length of the dielectric portion 425 is about 0 nm or about 34 nm, for example. The difference between the etch stop length 470 of the heat sink layer and the etch stop length of the dielectric portion 475 may be between about 0 nm and about 75 nm. In some cases, the difference is between 10 and 60 nm or between about 10 and 30 nm. In an example, the heat sink portion comprises Au and the dielectric comprises $SiO_2$. The etch stop length of the heat sink portion after milling is about 70.7 nm. The etch stop length of the dielectric after milling is about 0 nm. The slope of the planar upper surface of the heat sink is about 26.4 degrees.

Figure 5:
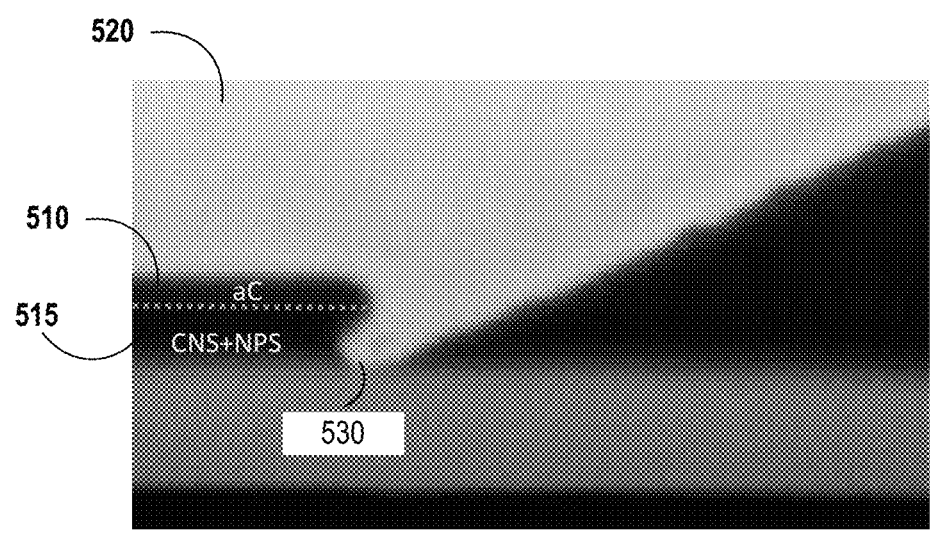

As seen in the image of FIG. 5, the excessive etching of the dielectric causes a trench 530 to be formed under the etch stop layers 510, 515. This may cause a void when the write pole is deposited in region 520.

Figure 6:
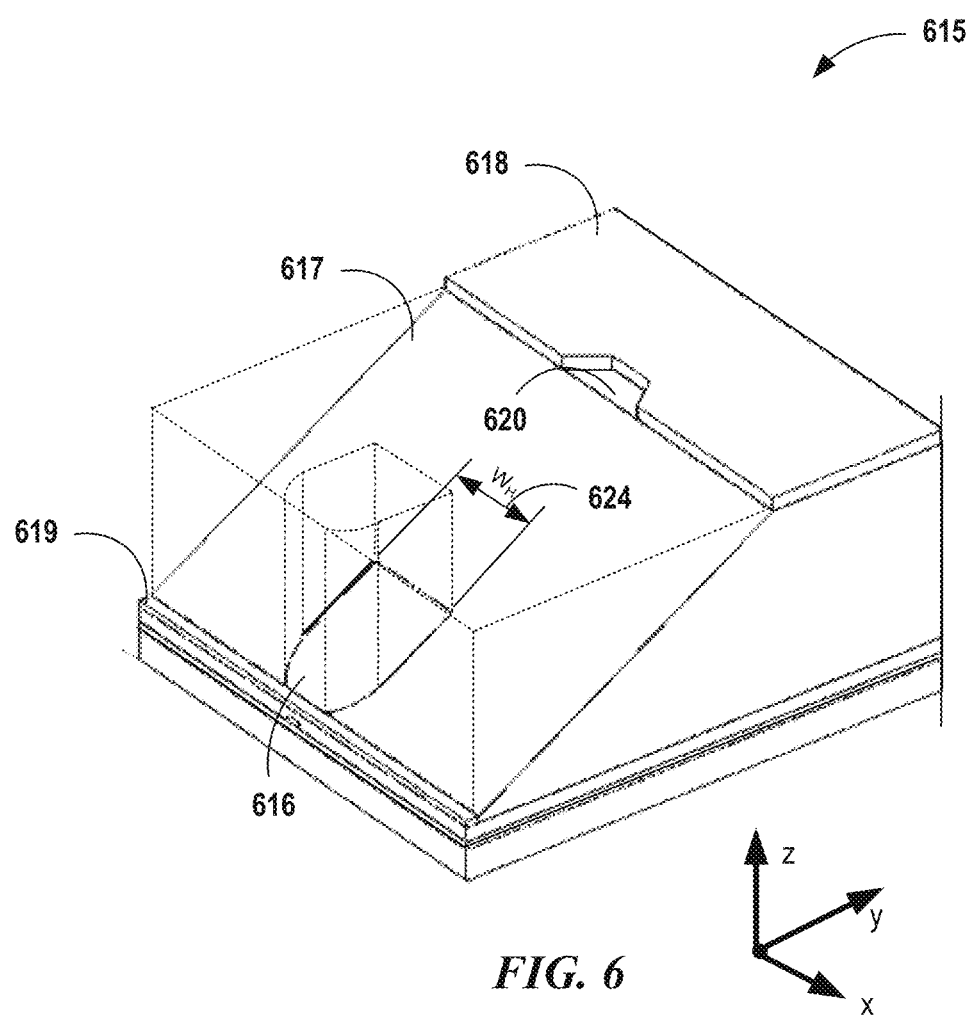
FIG. 6 is an isometric view illustrating an NFT system with a section of the hardmask removed before milling according to various embodiments.

In order to more evenly mill the NFT and surrounding dielectric, a hardmask is formed on a top layer. A section of the hardmask may be removed. FIG. 6 illustrates an NFT system 615 with a section 620 of a second hardmask 618 removed. The broken lines illustrate the portions of the NFT 616 and surrounding dielectric 617 that are milled away. The shape of the hardmask 618 can be defined via a photolithographic pattern. The heat sink has an associated width ($W_H$) 624, and this roughly corresponds to the width of the section 620. According to various embodiments, $W_H$ is between about 200 nm and 600 nm. For example, $W_H$ may be about 420 nm. Generally, this section promotes more aggressive milling of the NFT 616 and less aggressive milling of the surrounding dielectric 617. Accordingly, the step near the lower hard mask 619 will be more uniform.

Figure 7A:
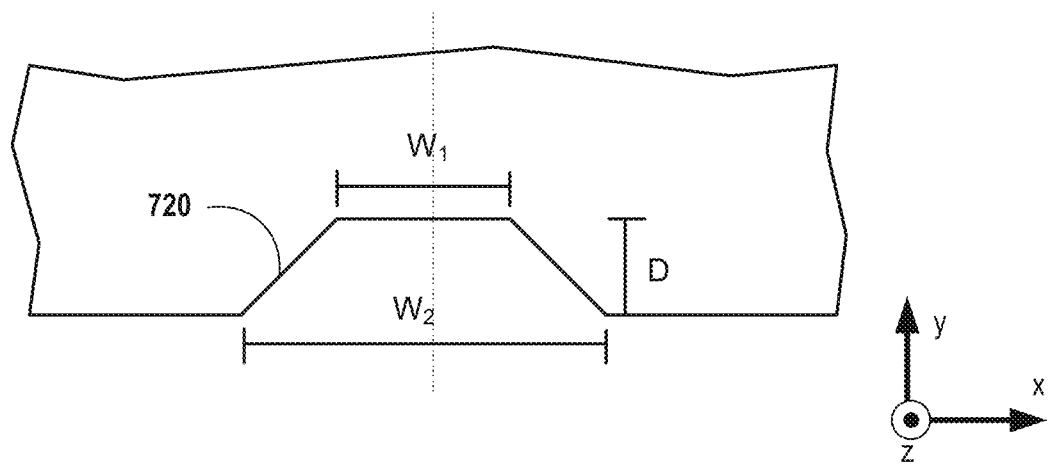
FIGS. 7A-7C and 8A-8B are block diagrams illustrating various shapes for the recess of the hardmask in accordance with example embodiments.
Figure 7B:
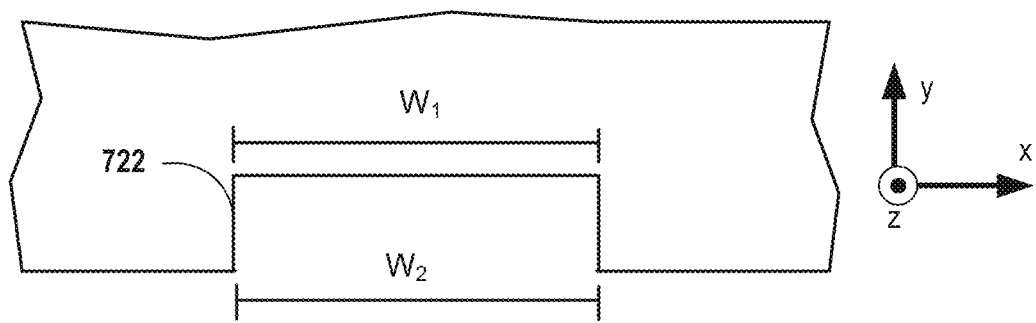
Figure 7C:
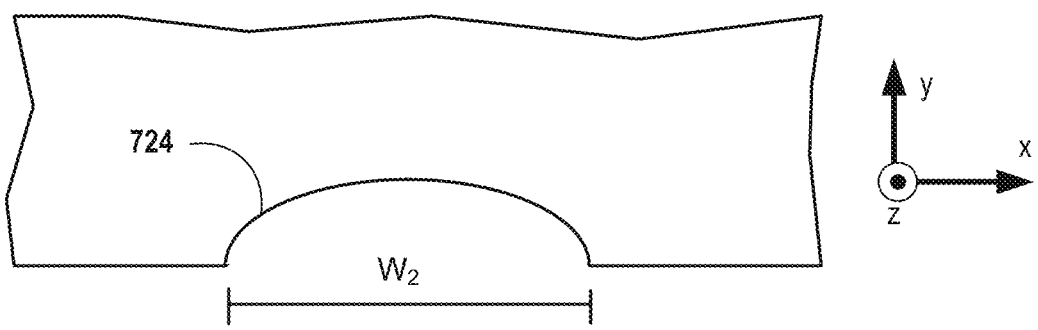

The recess of the hardmask may be differently shaped than shown in FIG. 6. Different shapes may account for process differences, different materials, different NFT shapes, etc. Block diagrams in FIGS. 7A-7C illustrate various shapes for the recess. These diagrams are all plan views on the substrate-parallel plane. FIG. 7A illustrates a trapezoid shaped recess 720 having a first width ($W_1$) and a second width ($W_2$). In some cases, at least one of $W_1$ and $W_2$ is the substantially the same as $W_H$ 624. In some cases, one or both of $W_1$ and $W_2$ are different than $W_H$ 624. According to various implementations, $W_1$ and $W_2$ are substantially the same. $W_1$ and $W_2$ may be between about 300 nm and 800 nm. For example, $W_1$ may be about 450 nm and $W_2$ may be about 650 nm. FIG. 7B illustrates an example in which the recess 722 has $W_1$ and $W_2$ that are about the same. In some cases, the recess includes one or more curves. FIG. 7C shows an example in which one side of the recess 724 is curved. The depth (D) of the recess may also have different values. For example, D may be between about 0 nm and 200 nm. For example, D may be about 100 nm.

Figure 8A:
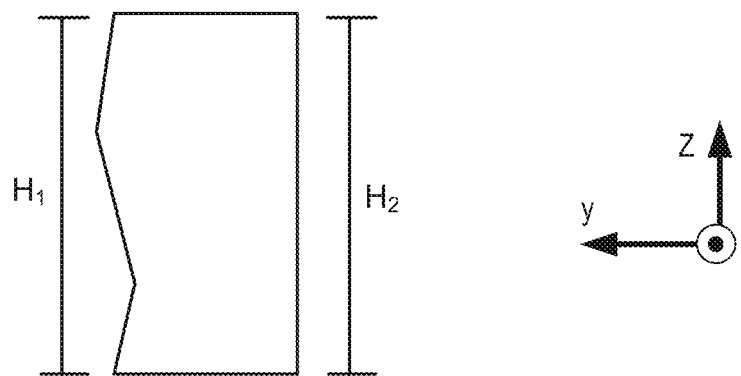
Figure 8B:
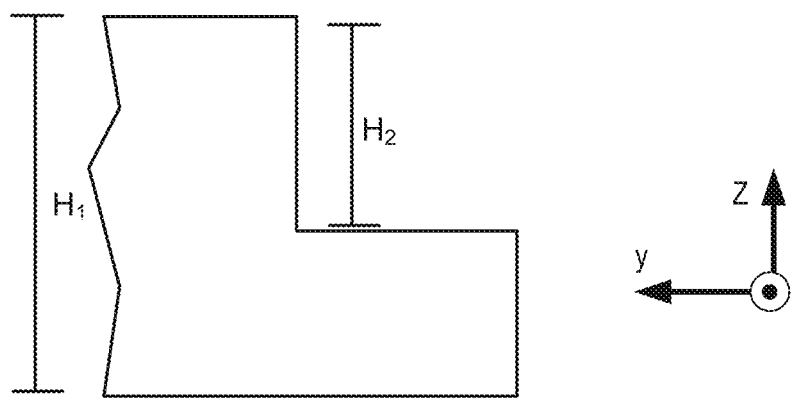

According to various embodiments, the recess includes an edge profile as shown in FIGS. 8A and 8B. The diagrams of FIGS. 8A and 8B show cross sections along the cut line of FIG. 7A. The illustrated profiles may be maintained along an entire portion of a height of the hardmask as in FIG. 8A and/or a portion of the hardmask as in FIG. 8B.

Figure 9A:
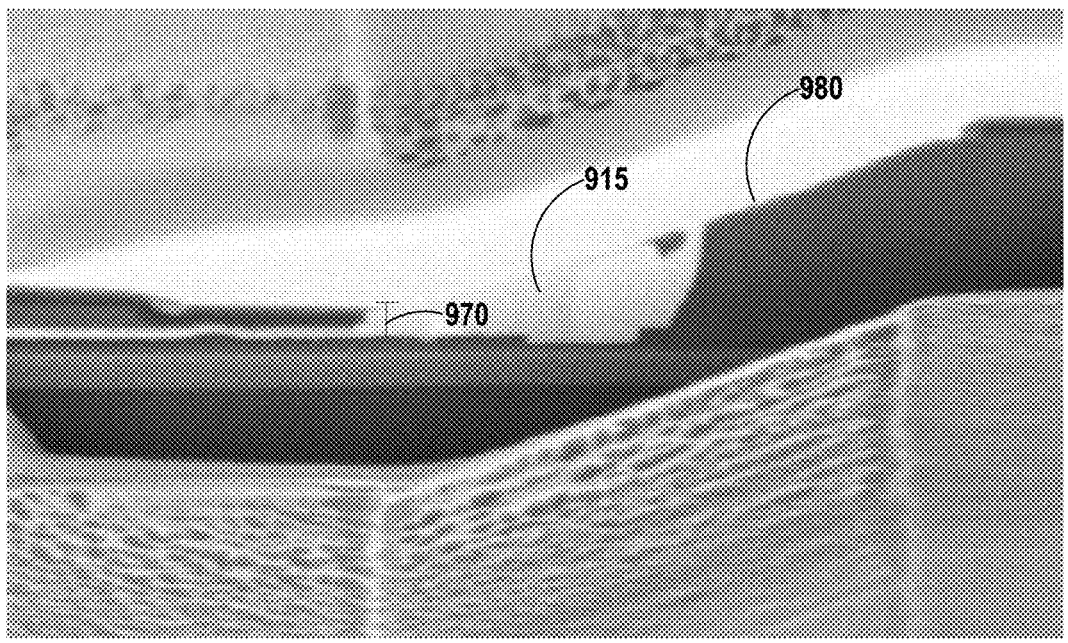
FIGS. 9A, 9B, and 10 are electron microscope images illustrating examples using a hardmask with a recess according to various embodiments.
Figure 9B:
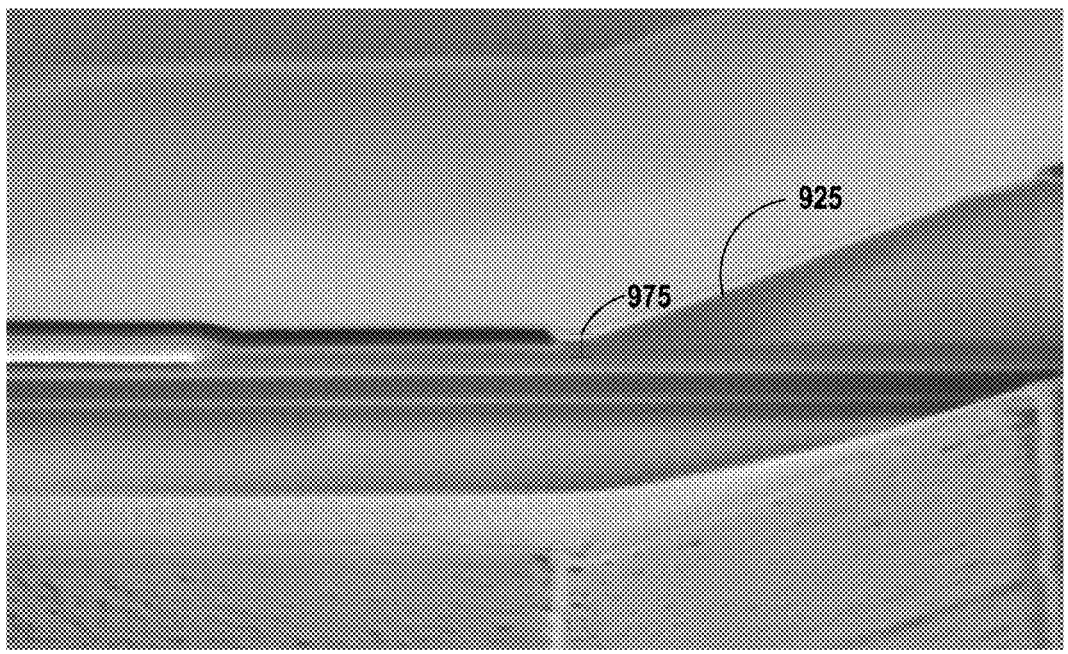
Figure 10:
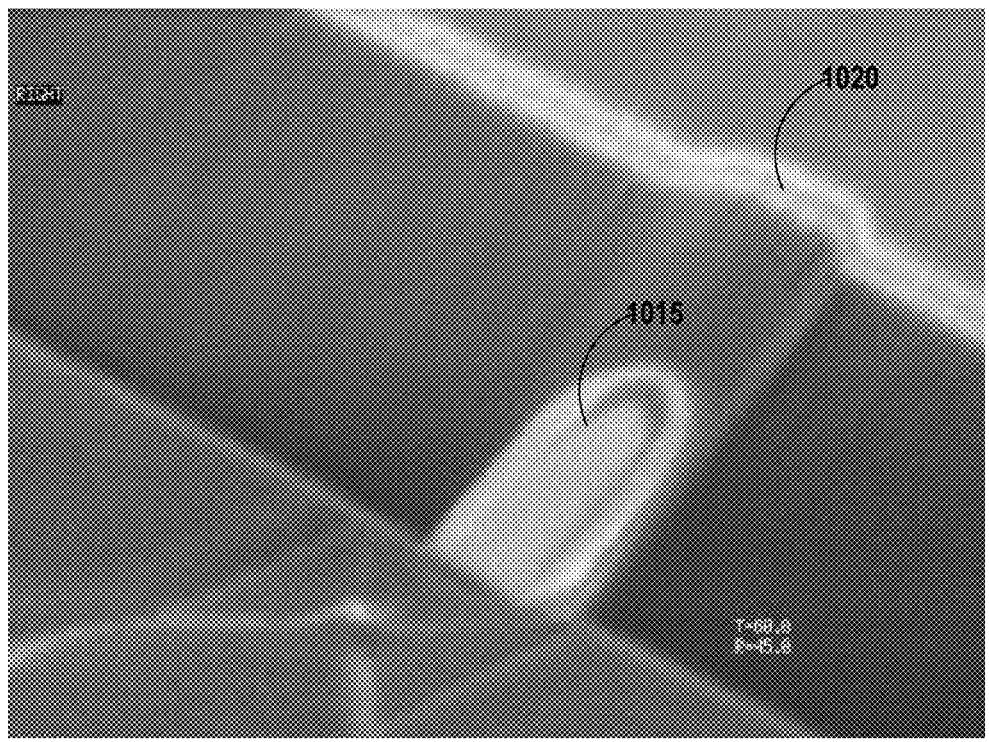

FIGS. 9A and 9B illustrate an example of milling an NFT and dielectric using a hardmask with a recess. The image in FIG. 9A illustrates the etch stop length 970 of the heat sink portion 915. The etch stop length 970 is about 44 nm. The image in FIG. 9B shows the etch stop length 975 for the dielectric portion 925. In this example, the etch stop length 975 of the dielectric portion is about 33.9 nm. As shown in FIGS. 9A and 9B, the difference between the etch stop length 970 of the heat sink layer and the etch stop length of the dielectric portion 975 is about 10.1 nm. In this example, the slope 980 of the sloped planar upper surface and the slope of the dielectric portion is about 25.3 degrees. FIG. 10 illustrates another view of the NFT system having a heat sink 1015 and a hardmask having a recess 1020.

Figure 11:
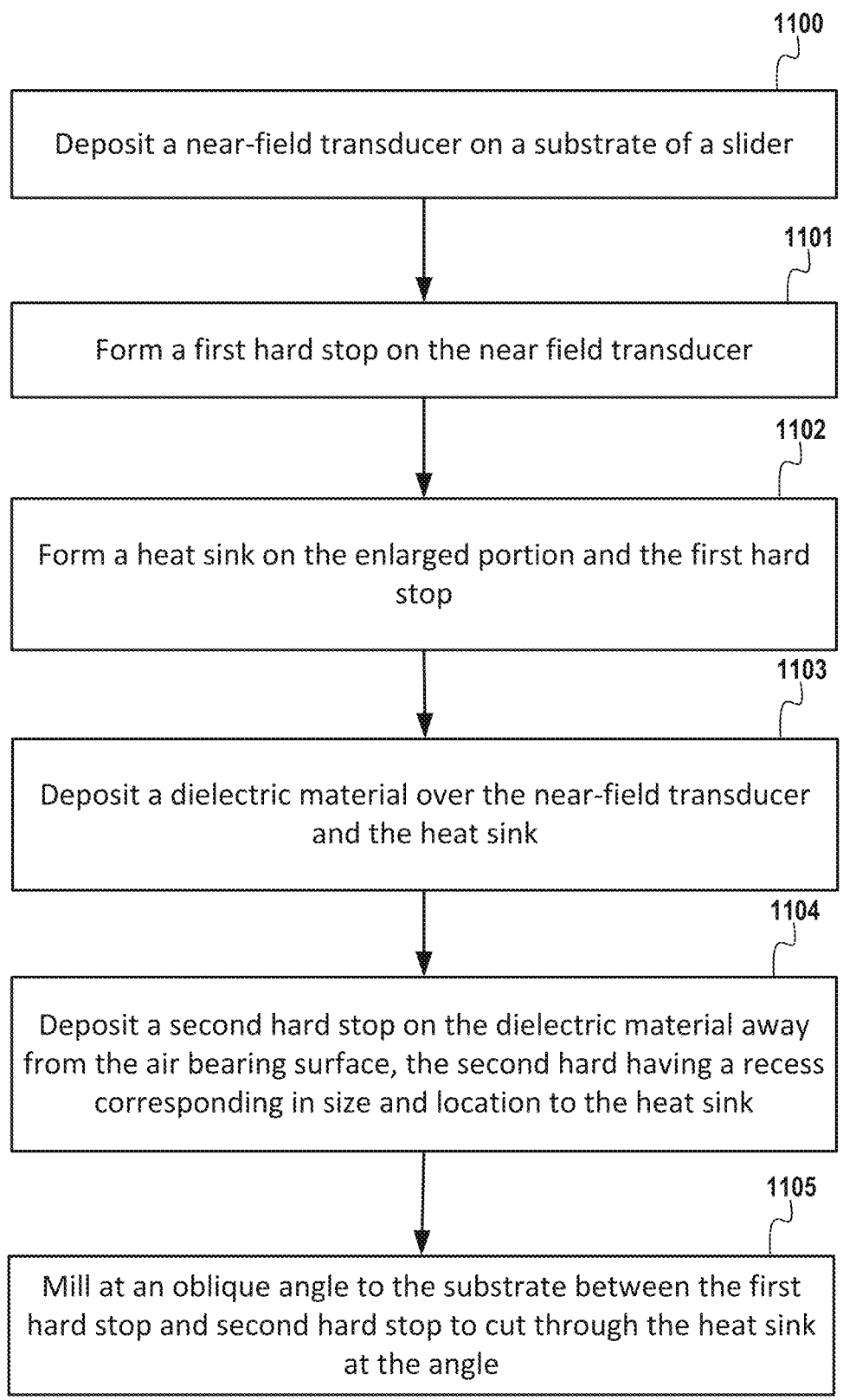
FIG. 11 is a flowchart of a method according to an example embodiment.

In FIG. 11, a flowchart illustrates a method according to an example embodiment. The method involves depositing 1100 a near-field transducer on a substrate of a slider. The near-field transducer has a plate-like enlarged portion and peg portion. A first hard stop is formed 1101 extending from a near field transducer and an air bearing surface. A heat sink is formed 1102 on the enlarged portion and the first hard stop. A dielectric material is deposited 1103 over/around the near-field transducer and the heat sink. A second hard stop is deposited 1104 on the dielectric material away from the air bearing surface. The second hard stop has a recess corresponding in size and location to the heat sink. The heat sink and dielectric are milled 1105 at an oblique angle to the substrate between the first hard stop and second hard stop to cut through the heat sink at the angle. The recess of the second hard stop increases a milling rate over the heat sink compared to a second milling rate of the dielectric away from the heat sink.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method of forming a near-field transducer system comprising:

depositing a near-field transducer on a substrate of a slider, the near-field transducer comprising an enlarged portion and a peg portion;

forming a first hard stop extending from the near-field transducer to an air bearing surface;

forming a heat sink on the enlarged portion and the first hard stop;

depositing a dielectric material over the near-field transducer and the heat sink;

depositing a second hard stop on the dielectric material away from the air bearing surface, the second hard stop comprising a recess; and milling at an angle to the substrate between the first hard stop and second hard stop to cut through the heat sink at the angle, the recess of the second hard stop increasing a milling rate over the heat sink compared to a second milling rate of the dielectric away from the heat sink.

2. The method of claim 1, wherein after the milling, the heat sink has a sloped planar upper surface and a planar lower surface, the planar lower surface facing the enlarged region.

3. The method of claim 2, wherein the width of the heat sink between the sloped planar upper surface and the planar upper surface is in a range from about 15 nm to about 50 nm.

4. The method of claim 2, wherein the width of the heat sink between the sloped planar upper surface and the planar lower surface is about 25 nm.

5. The method of claim 2, wherein a slope of the planar upper surface with respect to the substrate after the milling in a range from about 20 degrees to about 30 degrees.

6. The method of claim 1, wherein the recess has a trapezoidal shape.

7. The method of claim 1, wherein the recess has at least one curve.

8. The method of claim 1, wherein the recess has a rectangular shape.

9. The method of claim 1 wherein the heatsink is cylinder like.

10. The method of claim 1 wherein the heatsink comprises Au.

11. The method of claim 1, wherein the dielectric material comprises one or more of $SiO_2$ and $Al_2O_3$.

12. The method of claim 1, wherein the recess corresponds in size and location to the heat sink.

13. A method of forming a near-field transducer system comprising:

depositing a near-field transducer on a substrate of a slider, the near-field transducer comprising a plate-shaped enlarged portion and a peg portion;

forming a first hard stop extending from the near-field transducer to an air bearing surface;

forming a heat sink on the enlarged portion and the first hard stop, the heat sink comprising a first material;

depositing a dielectric over the near-field transducer and the heat sink, the dielectric comprising a second material;

depositing a second hard stop on the dielectric material away from the air bearing surface, the second hard stop comprising a recess; and milling at an oblique angle to the substrate between the first hard stop and second hard stop to cut through the heat sink at the angle, the recess of the second hard stop increasing a milling rate of the first material compared to a second milling rate of the second material.

14. The method of claim 13, wherein after the milling, the heat sink has a sloped planar upper surface and a planar lower surface, the planar lower surface facing the enlarged region.

15. The method of claim 14, wherein the width of the heat sink between the sloped planar upper surface and the planar upper surface is in a range from about 15 nm to about 50 nm.

16. The method of claim 14, wherein the width of the heat sink between the sloped planar upper surface and the planar lower surface is about 25 nm.

17. The method of claim 14, wherein a slope of the planar upper surface with respect to the substrate after the milling in a range from about 20 degrees to about 30 degrees.

18. The method of claim 13, wherein the first material comprises Au.

19. The method of claim 13, wherein the second material comprises one or more of $SiO_2$ and $Al_2O_3$.

20. The method of claim 13, wherein the recess corresponds in size and location to the heat sink.

* * * * *